(12) United States Patent
Du

(10) Patent No.: US 9,425,991 B2
(45) Date of Patent: Aug. 23, 2016

(54) SYSTEMS AND METHODS OF TRACKING THE DELIVERY AND POST-DELIVERY STATUS FOR ELECTROMAGNETICALLY TRANSMISSIBLE CONTENTS DELIVERED VIA USER INITIATED AND CONTROLLED HYBRID DELIVERY MODES

(76) Inventor: Lee Du, Palo Alto, CA (US)

( * ) Notice: Subject to any disclaimer, the term of this patent is extended or adjusted under 35 U.S.C. 154(b) by 2 days.

(21) Appl. No.: 13/366,349

(22) Filed: Feb. 5, 2012

(65) Prior Publication Data

US 2012/0136713 A1    May 31, 2012

Related U.S. Application Data

(63) Continuation-in-part of application No. 12/077,105, filed on Mar. 17, 2008, which is a continuation-in-part of application No. 12/928,984, filed on Dec. 24, 2010.

(60) Provisional application No. 61/462,910, filed on Feb. 8, 2011, provisional application No. 60/997,252, filed on Oct. 1, 2007, provisional application No. 61/284,897, filed on Dec. 28, 2009.

(51) Int. Cl.
*G06F 15/16* (2006.01)
*H04L 12/58* (2006.01)
*G06Q 30/02* (2012.01)
*H04L 29/08* (2006.01)

(52) U.S. Cl.
CPC ........ *H04L 12/5885* (2013.01); *G06Q 30/0242* (2013.01); *H04L 12/5835* (2013.01); *H04L 51/066* (2013.01); *H04L 51/34* (2013.01); *H04L 67/06* (2013.01)

(58) Field of Classification Search
CPC ........ G06K 19/06; G06F 15/16; G06Q 30/02; H04L 51/34; H04L 51/066
USPC .............. 709/206, 201, 203, 204; 705/14.41
See application file for complete search history.

(56) References Cited

U.S. PATENT DOCUMENTS

| 5,790,790 A | * | 8/1998 | Smith ................ G06F 17/3089 707/E17.116 |
| 6,573,927 B2 | | 6/2003 | Parulski et al. |
| 6,615,234 B1 | * | 9/2003 | Adamske et al. ............. 709/203 |
| 2006/0224687 A1 | * | 10/2006 | Popkin et al. ................. 709/217 |
| 2008/0294509 A1 | | 11/2008 | Gussoni |
| 2009/0089385 A1 | | 4/2009 | Du |
| 2010/0045816 A1 | | 2/2010 | Rhoads |
| 2010/0114700 A1 | | 5/2010 | Chamberlain |

* cited by examiner

*Primary Examiner* — Vivek Srivastava
*Assistant Examiner* — Normin Abedin
(74) *Attorney, Agent, or Firm* — Bo-In Lin

(57) ABSTRACT

The present invention discloses a network communication system that includes a network processing center for receiving and converting an electronic or electro-magnetically transmissible data/content into a physically deliverable object and/or network transmissible content data files for carrying out a hybrid delivery of the data/content by a physical delivery process and/or a network electro-magnetic delivery process to a recipient or an ECRMA. The delivery status of the electronic content and the post-delivery activities are tracked by a variety of mechanisms and the information obtained from the tracking is send back to the content-sender.

15 Claims, 6 Drawing Sheets

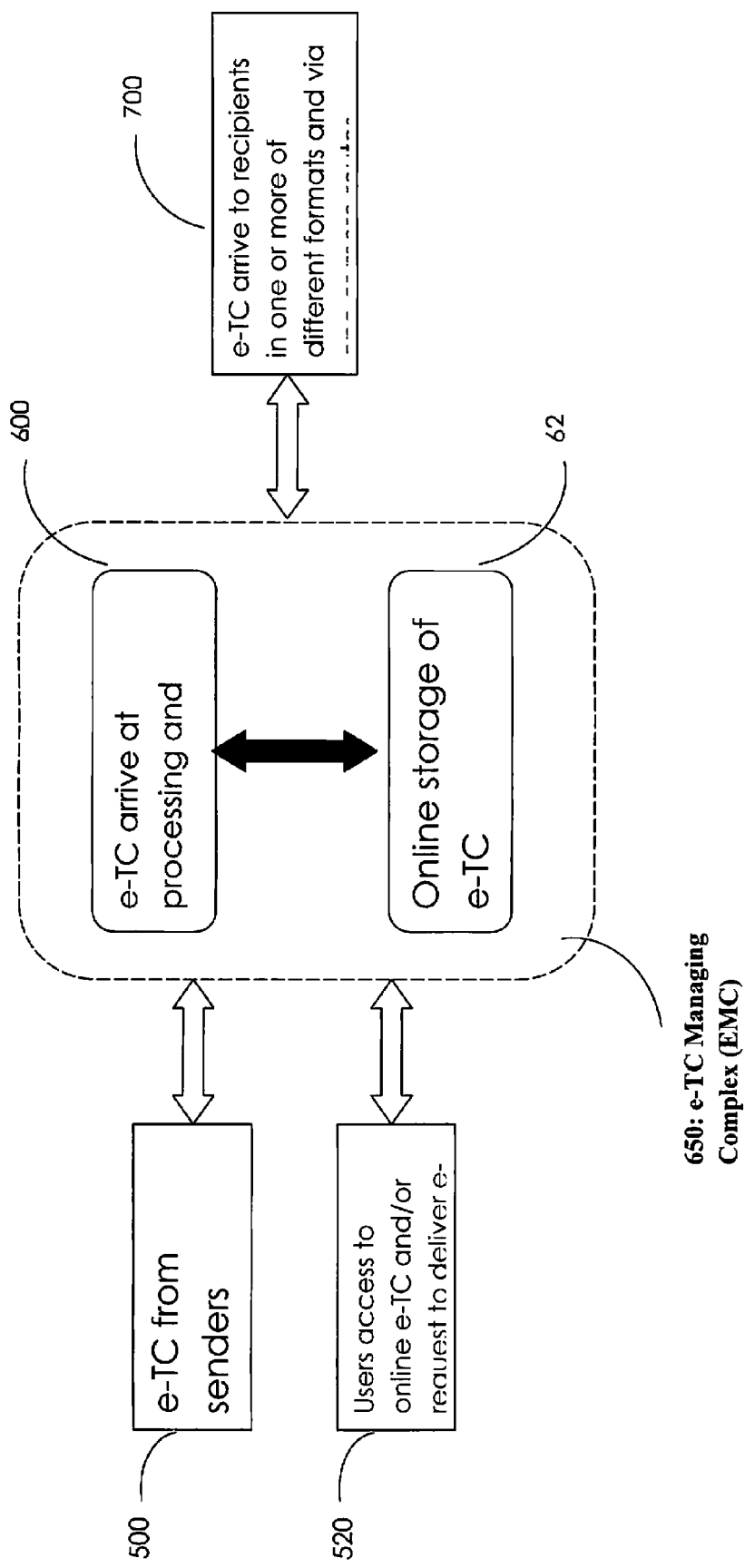
Fig. 4. e-TC managing system (EMS)

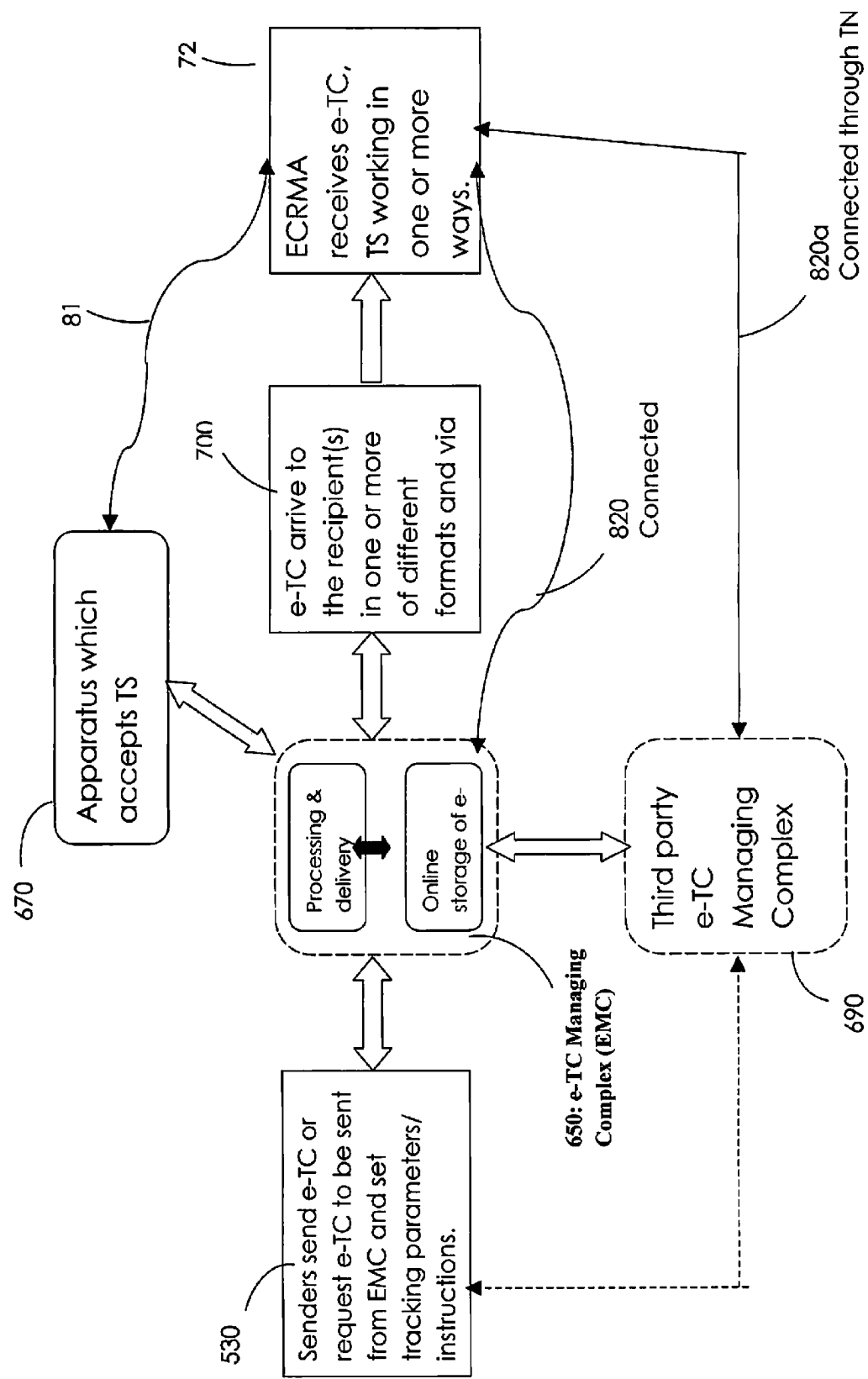
Fig. 5. Tracking system (TS) for the delivery and post-delivery activities of e-TC

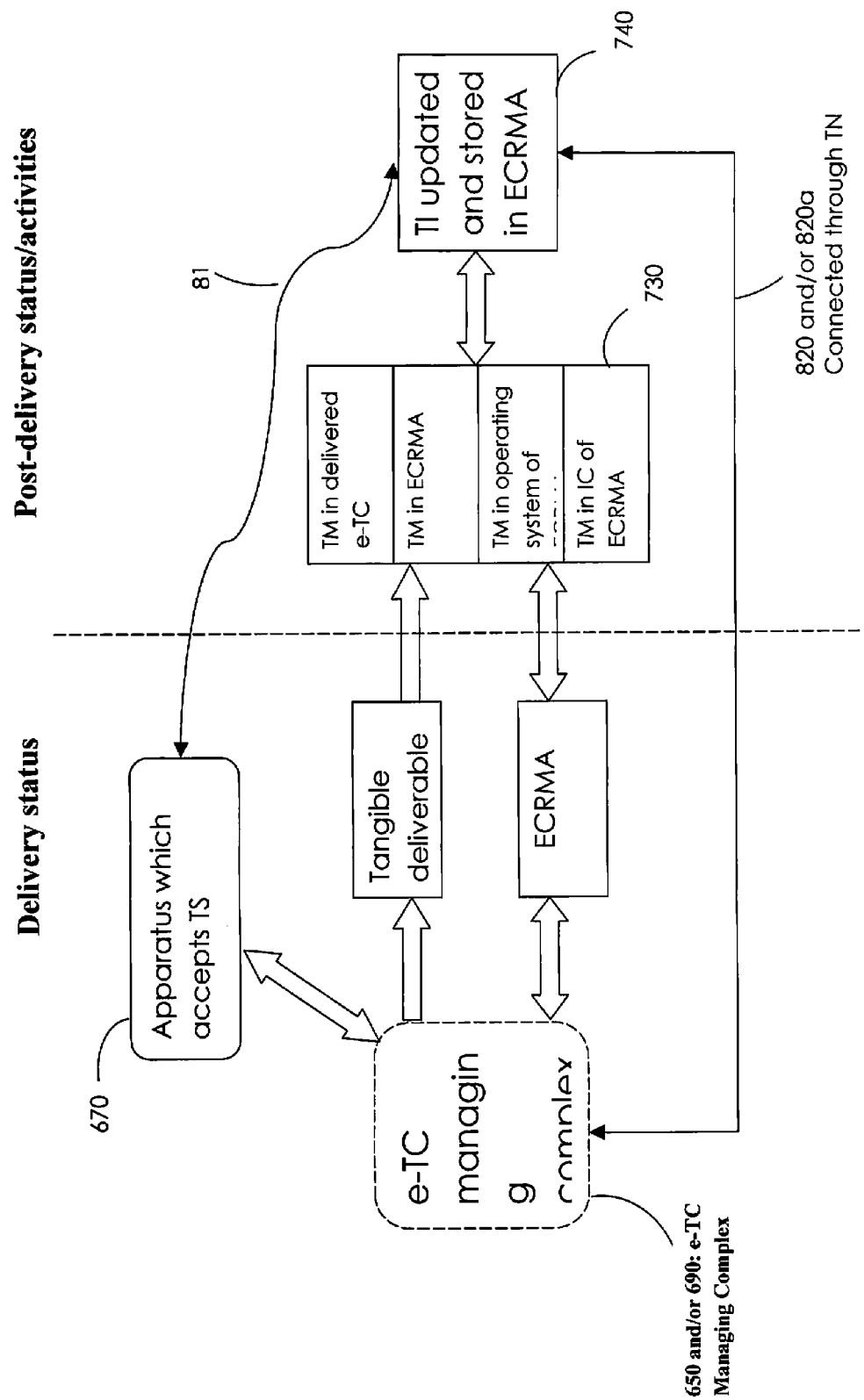
Fig. 6. Working of the tracking mechanisms (TM) for the delivery and post-delivery activities of e-TC

SYSTEMS AND METHODS OF TRACKING THE DELIVERY AND POST-DELIVERY STATUS FOR ELECTROMAGNETICALLY TRANSMISSIBLE CONTENTS DELIVERED VIA USER INITIATED AND CONTROLLED HYBRID DELIVERY MODES

This application is Non-Provisional Application and claims the Priority Date of a Provisional Application 61/462, 910 filed on Feb. 8, 2011 by a common invention of this patent application. This application is also a Continuation-in-Part application (CIP) of a Non-provisional Application Ser. No. 12/077,105 that was filed on Mar. 17, 2008 by the Applicant of this application. application Ser. No. 12/077,105 claims a priority of Oct. 1, 2007 of a provisional Patent Application No. 60/997,252. The disclosures made in Ser. No. 12/077,105 and 60/997,252 are hereby incorporated by reference in the present patent application. Furthermore, this application is a Continuation-in-Part application (CIP) of a Non-Provisional Application Ser. No. 12/928,984 filed on Dec. 24, 2010 claim a Priority of a Provisional Application No. 61/284,897 that was filed on Dec. 28, 2009 by the Applicant of this application. The disclosures made in application Ser. No. 12/928,984 and 61/284,897 are hereby incorporated by reference in this patent application.

BACKGROUND OF THE INVENTION

1. Field of the Invention

This invention relates generally to the systems and methods for tracking and obtaining feedbacks for electro-magnetically transmissible content (e-TC) delivered in an array of hybrid modes of content deliveries from a sender to the designated recipient. More particularly, this invention is related to methods and network systems that allows a sender to control, monitor and track the delivery of either an article that embodies the Internet-transmissible content or the delivery to different functional apparatus that embodies the content to designated recipients while providing feedback information to the sender.

2. Description of the Related Art

Even through more communications are now carried over the Internet with higher transmission speed and greatly improved efficiency, however, there are still limitations that the Internet communications cannot satisfy. A most obvious limitation is a communication to a person who has limited or even no access to Internet. This group of people may include some elderly individuals or economically disadvantaged people who do not use a computer or devices to have the Internet access at all. As senders of information often initiate a message that is suitable for Internet transmission, e.g., e-mail, the senders are required to apply a different mode of communication, e.g., sending the message as printed copy separately through regular mail services, in order to send the same message to a person who does not communicate over the Internet.

Furthermore, in the field of commercial advertisement, there are still a large amount of printed materials delivered through the regular mail services in the form of direct mail for promoting commercial products or services. However, such distribution of the printed materials for product or service promotion are limited to certain geographic locations, generally within the territory of a nation through the domestic mail services due to cost considerations. International delivery of printed materials would be too costly for mass mail promotions. Notwithstanding the availability of high-speed data transmission across the globe without national boundaries, an effective solution to overcome the geographic limitations of mail deliveries is still not yet available.

Another limitation of the information flow in the printed format such as the printed ads is the difficulty to obtain feedback after the delivery. The marketers usually do not know how many printed ads are accessed or read by the recipients and how many ads actually produced the desired marketing effect. The marketers cannot follow the scope of circulation of the printed ads. In addition, it is inconvenient and inefficient to spread the information of the printed ads as compared to the electronic (digital) ads (e-ads) in the form of e-TC.

E-TC such as e-ads transmitted through the Internet are efficient and convenient to be spread and are used more often. However, the delivery format of e-TC through Internet has the limitation to reach the group of people who have no or limited Internet access. Further limitation of delivering e-TC over the Internet is the lack of information over the recipient's geographic and other status.

In the field of advertising, both printed ads and e-ads have the limitation that there are no processes for monitoring the customer's buying decision, i.e., the conversion rate. Once the printed ads and/or the e-ads are sent, the advertiser has very little information to assess the effectiveness of the advertisements due to the limited amount of information the advertiser can collect about the customer's response to the advertisements delivered either by mail or by Internet.

In a broader sense, when e-TC is received through the Internet or non-Internet routes, and then accessed in the offline environment, i.e., not directly connected with the Internet, it remains unknown to the advertiser as the e-TC sender how the e-TC is accessed or manipulated in various ways. Therefore, it is difficult to assess how much effort and financial resources are effective or wasted by sending out e-TC as advertisements to large number of receivers with very limited amount of information about receiver's response to these advertisements.

In order to overcome the above-discussed limitations and difficulties, a prior patent application Ser. No. 12/077,105 was submitted by the Applicant of the present invention to disclose systems and methods to deliver tangible deliverable objects that contain e-TC including multimedia contents that may be transmitted over the telecommunication networks (TN) with its various sub-networks interconnected by the connections include but not limited to Internet, the wired and wireless telephone networks, cable systems, satellite communication system, near filed communication system, etc. The sub-networks of TN includes but not limited to Intranet, Wide Area Network (WAN), Metropolitan Area Network (MAN), Campus Area Network (CAN), Local Area Network (LAN), Wireless local area network (WLAN), Personal Area Network (PAN) such as the Bluetooth, WPAN (wireless personal area network), Virtual Private Network (VPN), Client/Server Network, Peer-to-Peer Network, various ways near field communication (NTC), etc., and various future networks of the TN.

However, the delivery of a tangible deliverable object has several limitations. The first limitation is a requirement of the involvement of a delivery agent and/or vehicle to accomplish the delivery of the tangible deliverable. It may be difficult where conditions limit the travel of the delivery agent and/or vehicle to reach the delivery destination. A second limitation is the time required for the process to deliver the tangible deliverable. Delivery may take a relatively extended time in delivering to destinations due to travel difficulties, and/or other situations, even that the delivery process is much faster than the traditional mail system, especially under the circumstances when the delivery must cross over the state and national boundaries. Furthermore, a sender has only limited choices to select the final delivery form, i.e., in the form of a tangible deliverable. Thus, a co-pending provisional application No. 61/284,897 that was filed on Dec. 28, 2009 by the applicant of this application addressed further the systems and methods to more effectively deliver and content in electronic format.

Therefore, a need exists in the art of obtaining feedback for e-TC via hybrid delivery modes to provide improved system configuration to dynamically track the post-delivery status of e-TC such that the above-discussed difficulties and limitations may be resolved.

SUMMARY OF THE PRESENT INVENTION

It is therefore an aspect of the present invention to provide new and improved systems and methods to facilitate more rapid and efficient delivery of e-TC that are transmissible through the telecommunication network, and to provide a more informative way to track the e-TC after their delivery. The delivery of e-TC can be accomplished by use of a tangible deliverable object that embodies the contents transmitted in the electromagnetic form via the telecommunication networks or through electronic content receiving/managing apparatus (ECRMA) or varieties of routes and forms such that the efficiency of delivery can be improved and the time of delivery can be further shortened.

E-TC delivered to the designated recipient can be processed and tracked in a variety of ways to provide useful feedback to the sender.

Specifically, it is an aspect of the present invention to provide systems and methods with server stations and/or centers function as e-TC managing complex (EMC) and also remote distribution stations. The EMC is connected to the Internet or any other types of network systems for transmitting e-TC. The EMC receive the e-TC. The EMC can either convert the e-TC into physically deliverable items to execute a delivery program as instructed and designated by a message sender to the designated recipient. Alternately, the server station may transmit the network transmissible contents to the ECRMA that may include but not limited to content-receiving equipment such as passive receiver devices accessible by user(s) and/or e-mail devices ready for carrying out further operations on the electronic contents. An example of this application is that the aforementioned information is downloaded to a mobile phone, or a digital media player such as iPod and iPad [iPod and iPad are TM of Apple, Inc.]), and the mobile phone or media player is delivered to the designated recipient. Then, if desired, the information in the delivered device, in its original form or after undergoing further processing, can be resent to another recipient through the telecommunication networks.

Another aspect of this invention is to provide convenience and efficiency by setting up the e-TC managing complex (EMC) with server stations connected through telecommunication network to an e-TC sender. A message sender transmits network transmittable contents to the server stations. The server stations receive the e-TC transmitted over the network and carry out an optional operation to either convert the e-TC into tangible deliverable items such as a printed document, a compact disk, or any other physical embodiment of e-TC according to the content sender's instruction. Alternately, the server stations may execute a process to transmit the contents to an electronic content receiving and managing apparatus (ECRMA) that allows the e-TC information be transmitted through a telecommunication network (TN) in a non-tangible format. The delivery process will not be affected by traffic conditions in the real world. The delivery time is much faster than the delivery of a tangible deliverable. The process is more resource-efficient as it involves less manpower and other resources. The ECRMA can be a more functioning-capable device, network, computer system and/or a broad variety of network or wireless e-TC receiving, processing, managing and re-transmitting apparatuses. This feature is especially useful in the field of digital document management. One specific example is to provide the delivered contents and store the contents in various 'fee-per-service' facilities.

Another aspect of this invention is to provide a hybrid e-TC delivery system wherein the said contents may be delivered by the delivery of a tangible deliverable. Furthermore, the e-TC from various senders can be delivered in one single tangible deliverable, increasing the efficiency of delivery materials. And the information from various e-TC senders can be distinguished, categorized and separately processed by either embedded mechanism including but not limited to software function in the tangible deliverable, and/or by dedicated software which the recipient can use. This system of this invention will enable any e-TC to be converted to TN-transferable by individual user(s) or by the service station(s) of the system, to be delivered in multiple routes, devices, and functional processes. People with or without access to TN can send the information to be delivered via TN in multiple manners. The system of this invention therefore provides more choices to deliver the e-TC.

Furthermore, in this hybrid delivery system, the tangible deliverable can be a device. This device is a tangible deliverable, but not a simply a storage medium of magnetic/optical medium. It can have the function of displaying and processing the contained electromagnetic information of text, audio, graphic/video data and any other electromagnetic information. It also has the capability to resend the aforementioned information by connecting itself through the TN.

Another aspect of this invention is to provide a great deal of flexibility for the sender to specify and customize the packaging and forms of the deliverable items and furthermore, the delivery destination may include an e-mail device which can be an element of the ECRMA. The e-mail devices differ from other e-mail services currently in use in the following ways. The 'list of contents' in the 'mail' can be viewed before a decision was made to selectively open or download part or whole of the 'mail'. The contents can be further sent to different passive receiver devices even before the 'mail' is opened. In this case further functional processes may be carried out without the need to upload the contents. Of course, additional content can be added (uploaded) to the previous content and sent as a new 'package'. This e-mail device can receive 'mail' from users who have no access to TN. One request from the sender allows the TN-transferable e-TC to be sent in different and multiple ways, it can be a tangible, and/or intangible format(s) including the ECRMA. Furthermore, the server station(s) in the system and/or the ECRMA can function in many ways to accomplish the information processing including but not limited to processing the specific e-TC code (SEC) which were send via the said various delivery routes from the EMC. The ECRMA can also have the conversion features of converting among different formats of audio, textual, graphic and contents, e.g., to convert video or audio contents to textual output or converting a textual data into audio output thus the ECRMA can further enhance the convenience and process of the e-TC received by the recipients.

Another aspect of this invention is the feature of providing a delivery status-tracing feature to continuously monitoring and confirming the delivery status through the delivery server stations and/or delivery agents distributed over different locations and connected with the EMC. Such monitoring and confirmation features for delivery status are particularly useful for timely and securely delivering legal or time-sensitive materials.

Another aspect of this invention is the continuous updating of the recipient's physical location, through various location-tracking technologies including but not limited to GPS and other location tracking or checking mechanisms, so that the most accurate delivery location and time can be sent back to the e-TC sender(s).

Another aspect of this invention is to provide a way to track the flow of e-TC after the delivery. Each manipulation of the e-TC, including but not limited to any forms to access the e-TC for viewing, to electronically copy the e-TC, to forward the e-TC or to make any modifications to the e-TC, will be digitally monitored, recorded and updated by either embedded mechanism including but not limited to software function in the tangible deliverable, in the operating system of the device the recipient may use, and/or by dedicated software which the recipient can use, or by any connection of the device which accesses the said e-TC, with the TN, or by a specific e-TC code (SEC) that is generated from the EMC and delivered to the recipients through all the said delivery routes. The code embodiment in the SEC is useful to trace and feedback to the sender the processes, transmissions, and application of the e-TC carried out by the e-TC receivers. The updated tracking information will be sent as feedbacks to the EMC through TN and further sent to the e-TC sender. Another alternative route is that the updated tracking information is obtained at the time the original recipient or subsequent recipient (received the e-TC from the original recipient in succession through forwarding, etc.) uses the information in the e-TC (such as an e-ads) with a real world service provider (such as a merchant who accepts the e-ads) who can obtain the updated tracking information and send it to the EMC through TN and further to the e-TC sender.

Special software will be used in this hybrid e-TC delivery system to facilitate all the functions described.

A special user account system will be set up to represent the users of this hybrid e-TC system to facilitate all the functions described.

Briefly, in a preferred embodiment, the present invention discloses a network communication system with dynamic feedbacks on the updated status of the e-TC flow. The network communication system further includes network processing stations/centers for receiving and converting e-TC through TN into a hybrid content deliverable object comprises e-TC data files and/or physically deliverable object for carrying out a hybrid delivery of the data/content by a physical delivery process and/or a network electro-magnetic delivery process to a recipient or an ECRMA. In an embodiment of the present invention, the network processing station further receiving and converting data/content transmitted with an electronic mail (e-mail) into a printed copy and/or the network transmissible content data files for physically delivering and/or transmitting through a network electro-magnetic delivery process to a recipient or an ECRMA. In another embodiment of the present invention, the network processing station further receiving and converting data/content transmitted with an electronic mail (e-mail) into a compact disk (CD)/DVD, or other magnetic/optical media and/or the network transmissible content data files as designated by the sender for physically delivering and/or transmitting through a network electro-magnetic delivery process to a recipient or and ECRMA. In another embodiment of the present invention, the network processing station further receiving and converting data/content transmitted with an electronic mail (e-mail) into a photographic picture and/or the network transmissible content data files for physically delivering and/or transmitting through a network electro-magnetic delivery process to a recipient or an ECRMA. In another embodiment of the present invention, the network processing station further receiving and converting data/content downloaded from a website or any other kinds of data-storage or downloadable e-TC resources into a printed copy and/or the network transmissible content data files for physically delivering and/or transmitting through a network electro-magnetic delivery process to a recipient or an ECRMA. In another embodiment of the present invention, the network processing station further receiving and converting data/content downloaded from a website or any other kinds of data-storage or downloadable e-TC resources into a compact disk (CD), or other magnetic/optical media and/or the network transmissible content data files as designated by the sender for physically delivering and/or transmitting through a network electro-magnetic delivery process to a recipient or an ECRMA. In another embodiment of the present invention, the network processing station further receiving and converting data/content downloaded from a website or any other kinds of data-storage or downloadable e-TC resources into a photographic picture and/or the network transmissible content data files for physically delivering and/or transmitting through a network electro-magnetic delivery process to a recipient or an ECRMA. All the above listed embodiments of the invention will be part of a continuously monitored and updated feedback system.

In summary, this invention discloses the method of obtaining continuous feedback for a hybrid method of delivering a physically deliverable object and/or e-TC data files to a remote recipient and/or an ECRMA. The hybrid method includes a step of transmitting an electronic or electro-magnetically transmittable content through a telecommunication network to a networked processing center/station for converting the electronic or electro-magnetically transmittable content into the physically deliverable object for delivering to and/or transmitting through a network electro-magnetic delivery process to the designated recipient and/or an ECRMA. In another embodiment, the step of transmitting and converting the electronic or electro-magnetically transmittable content further comprising a step of transmitting data/content with an electronic mail (e-mail) and converting the data/content into a compact disk (CD) or other magnetic/optical media and/or the network transmissible content data files as designated by the sender for delivering to the remote recipient and/or an ECRMA. In another embodiment, the step of transmitting and converting the electronic or electro-magnetically transmittable content further comprising a step of transmitting data/content with an electronic mail (e-mail) and converting the data/content into a photographic picture and/or the network transmissible content data files for delivering to the remote recipient and/or an ECRMA. In another embodiment, the step of transmitting and converting the electronic or electro-magnetically transmittable content further comprising a step of downloading data/content from a website or any other kinds of data-storage or downloadable e-TC resources and converting the data/content into a printed copy and/or the network transmissible content data files for delivering to the remote recipient and/or and ECRMA. In another embodiment, the step of transmitting and converting the electronic or electro-magnetically transmittable content further comprising a step of downloading data/content from a website or any other kinds of data-storage or downloadable e-TC resources and converting the data/content into a compact disk (CD) or other magnetic/optical media and/or the network transmissible content data files as designated by the sender for delivering to the remote recipient and/or and ECRMA. In another embodiment, the step of transmitting and converting the electronic or electro-magnetically transmittable content further comprising a step of downloading data/content from a website or any other kinds of data-storage or downloadable e-TC resources and converting the data file into a photographic picture and/or the network transmissible content data files for delivering to the remote recipient and/or an ECRMA. All the above listed embodiments of the invention will be part of a continuously monitored and updated feedback system.

These and other objects and advantages of the present invention will no doubt become obvious to those of ordinary skill in the art after having read the following detailed description of the preferred embodiments, which are illustrated in the various drawing figures.

BRIEF DESCRIPTION OF THE DRAWINGS

FIG. 4 is the e-TC managing system (EMS). The EMS includes the e-TC managing complex (EMC) which interacts with the e-TC senders and users of the online storage of e-TC. The EMC also interacts with the recipients of the e-TC. The EMC is the center of the EMS and provides ongoing feedback to the e-TC senders and/or users for the e-TC delivery status and post-delivery activities.

FIG. 5 is the system to track the delivery and post-delivery activities of e-TC.

FIG. 6 explains how the tracking mechanisms (TM) work to track the delivery and post-delivery activities of e-TC.

DETAILED DESCRIPTION OF THE PREFERRED EMBODIMENT

Reference is now made to the above listed figures for describing, in detail, the preferred embodiments of the present invention. The figures referred to and the accompanying descriptions are provided only as examples of the invention and are not intended in anyway to limit the scope of the claims appended to the detailed description of the embodiment.

Figure 1:
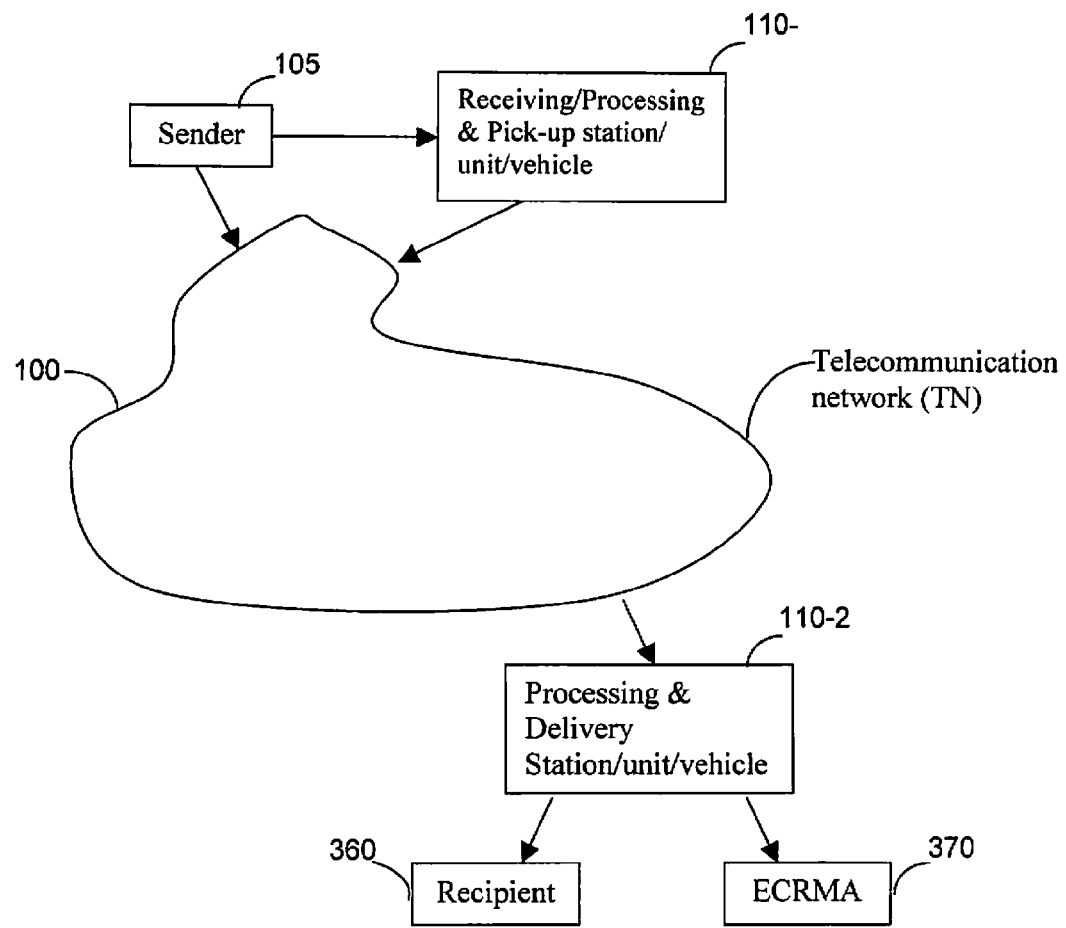
FIG. 1 is a network system includes processing station/unit/vehicle for receiving a sender-initiated message and orders to complete a delivery of hybrid delivery process that may include a tangible deliverable object and/or electro-magnetically transmissible content (e-TC) to an e-TC managing complex (EMC) and then to recipients and/or to electronic content receiving/managing apparatus (ECRMA).

FIG. 1 is a functional block diagram of a hybrid electronic content delivery system of this invention. An electronic content sender 105 has an option to either upload the electronic content as an electronically transferable file through a telecommunication network (TN) 100 such as an Internet telecommunication network (TN) 100 to transmit the electronic content to a first processing and delivery station 110-1 or a processing and delivery vehicle/personnel 110-1. The electronic content sender 105 has another option to physically handover a content embodiment device such as a USB drive, a DVD or a CD or any other kind of content embodiment device to a processing and delivery vehicle 110-1 or a processing and delivery station 110-1. The processing and delivery station then converts the electronic content delivered as the electronic embodiment device received from the electronic content sender 105 into a network transferable electronic content file that is ready for transfer over the telecommunication network (TN) 100 to a designated delivery destination. The designated delivery destination may include another processing and delivery station 110-2 on the recipient side to convert the electronic content into a deliverable electronic content embodiment device such as an USB drive, a DVD/CD or a printed document ready to deliver to an electronic content recipient 360 through a processing and delivery vehicle 110-2. Alternately, the electronic content may be transferred directly from the sender 105 to a processing and delivery vehicle 110-2 to process and deliver to the recipient 360. The electronic content may also be delivered to alternative designated delivery destination that is the ECRMA 370.

The electronic content receiving/managing apparatus (ECRMA) is an embodiment that covers a wide range of apparatus/devices. The simplest one may have the passive receiving function only while the more advanced one may carry on all function of receiving and managing electronic transmissible content (e-TC). The example of a simple ECRMA may be a device that can be connected to a wired or wireless phone line and receive or send e-TC. The example of a more advanced ECRMA may be a computer or a connected network of computers/apparatus and they can receive/send, store and manage/process the e-TC received and may retransmit the e-TC through the telecommunication networks (TN) to another recipient and/or apparatus in its original received form or in a processed/modified form. More examples of ECRMA may include smart phones, TVs, tablets, projectors, etc. The common feature of different ECRMA is that they all can receive/send e-TC through the TN via a data transfer protocol or other means.

It is understandable that the sender 150 of FIG. 1 can be a human or the non-human with the latter being an e-TC sending apparatus or its equivalent, or an ECRMA. It is from this point where the e-TC is originated in this hybrid e-TC delivery system.

Unlike the prior patent application Ser. No. 12/077,105 this invention now provides broader scopes and more varieties of deliverable methods and devices to deliver the electronic content transmissible through the telecommunication networks. The present invention further delivers the electronic content to different functional devices that can embody and also process the content for different purposes such as generate video and audio outputs and may further perform different functions by using the electronic content. This invention thus provides more convenient and useful ways a recipient of the electronic content can enjoy and make use of the content received. A data conversion option as now provided in this invention further provides flexibility for converting the formats of the messages in textual, audio or video forms for more convenient and flexible transmissions.

Figure 2:
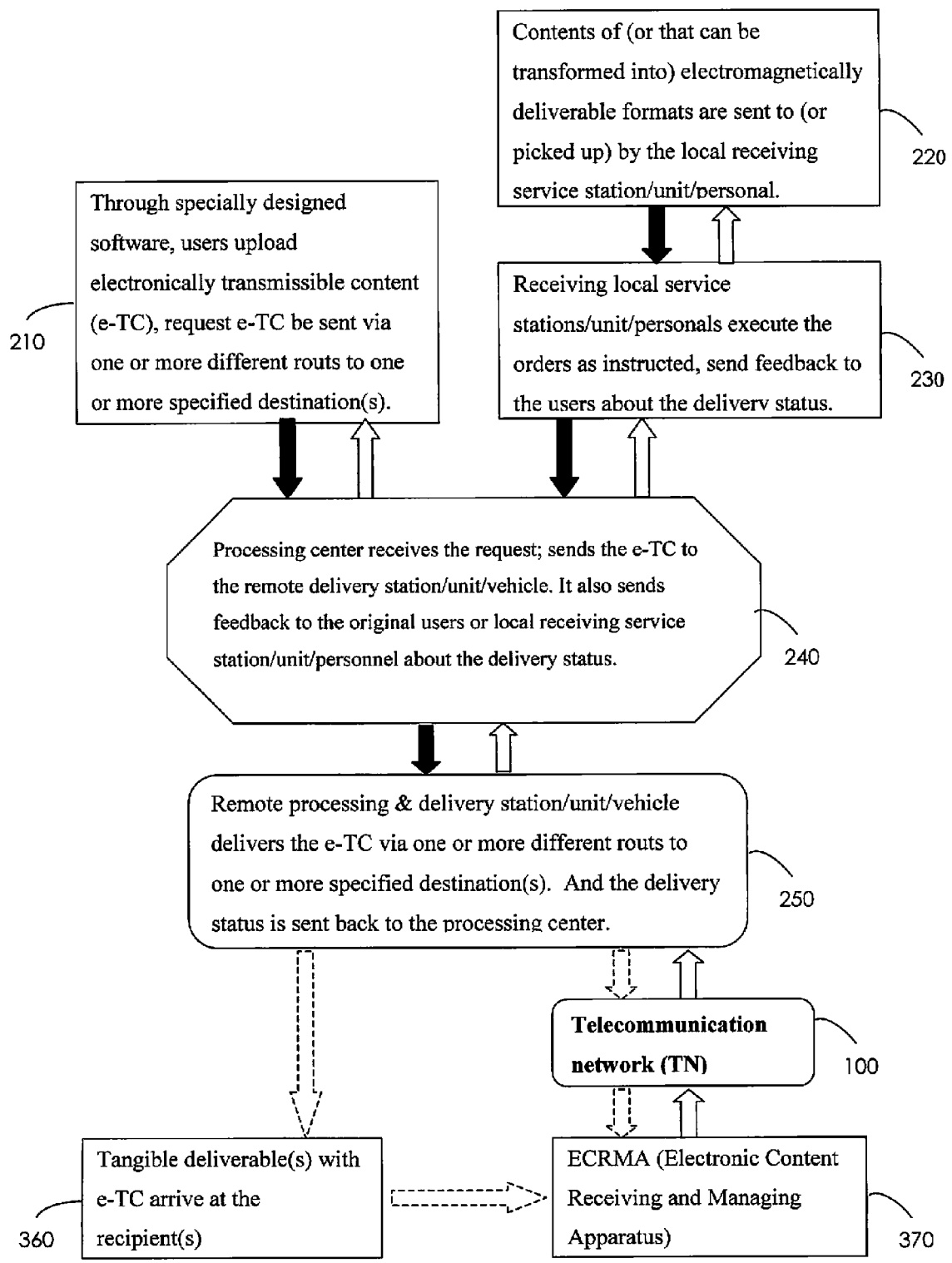
FIGS. 2 and 3 are flowcharts for showing the steps performed by the hybrid method of delivering, through the telecommunication network (TN), a physically deliverable object embodies e-TC and/or e-TC to an electronic content receiving/managing apparatus (ECRMA).

FIG. 2 is a flowchart for illustrating the processes according to an exemplary method of this invention. An electronic content sender 105 for sending the electronic content through the hybrid multimedia content delivery system of this invention starts the process by either upload electronically transmissible content (e-TC) through a telecommunication network to a processing center (step 210). In this case, the processing center may be an online delivery service station 110-1 in FIG. 1. Alternately, a user/sender 105 may physically deliver a medium embodies the said contents such as a letter or pictures, or other contents ready for or can-be-converted to network or electro-magnetically transmissible content to a local service station (Step 220), or drop the contents in pick-up locations/boxes arranged by the service station. Alternatively, the local receiving station/unit in Step 220 and Step 230 can be an automated setup with which the conversion of non-digital format to digital format (e-TC format) can be accomplished, with the digital format be sent along for its designated purpose. The local service station then executes the orders received from the user and sends a status report to the user to update the user about the delivery status (Step 230). The electro-magnetic transmissible content either uploaded or physically received by the processing center is sent to a remote delivery station through Internet or other methods of the telecommunication network (Step 240). In this step, the processing center further sends a status report to the user/sender about the reception and processing and delivery status of the content received.

Then the remote delivery stations or a processing and delivery vehicle has different options to process the electronic content received from the telecommunication network depending on different delivery routes and different final destinations of the electronic contents. The processing and delivery station or vehicle first determines a delivery route and destination and send a status back to the electronic content sender about the status of the process and delivery (step 250). The delivery and processing station or vehicle may convert the electronic contents into a physically deliverable item such as a printed letter, an advertisement printout, a photo album, a plastic card with magnetic storage strip or equivalent, a musical or video CD/DVD or its equivalent, or any deliverable object that embodies the magnetic media, optical media, and other types of medium as may be developed in the future. The physically deliverable items are then delivered to the recipients followed by a delivery status report sent back to the user (Step 360). In this case, the designated recipient receives the network or electro-magnetically transmissible content embodied in physical deliverable item. The delivery of the physically deliverable item can be flexibly arranged according to the instructions provided by the user when sending the contents through the network upload (step 210) or physically delivered contents to a local service station (Step 220). Additionally, the processing and delivery station or vehicle may further transfer the electronic contents through a telecommunication network (TN) (step 100*b*) to an electronic content receiving/managing apparatus (ECRMA) (step 370) that may include a passive receiver device or an e-mail device or any other network message receiving apparatuses or devices.

e-TC in the delivered tangible deliverable can then be sent and processed by sending the e-TC in the delivered tangible deliverable to an ECRMA (from 360 to 370 in FIG. 2). Thus the feedback information can also be sent to the original sender via the route of 370 (via 100*b*) to 250 to 240, then to the sender.

In reality, the apparatus to carry out the functions of different steps in FIG. 2 can be either segregated in different locations or combined into a single physical setup. In the route from step 210, the apparatus for step 210, 240 and 250 can be either segregated in different locations or combined into one or several physical setup. In the route from step 220, the apparatus for step 220, 230, 240 and 250 can be either segregated in different locations or combined into one or several physical setup.

Figure 3:
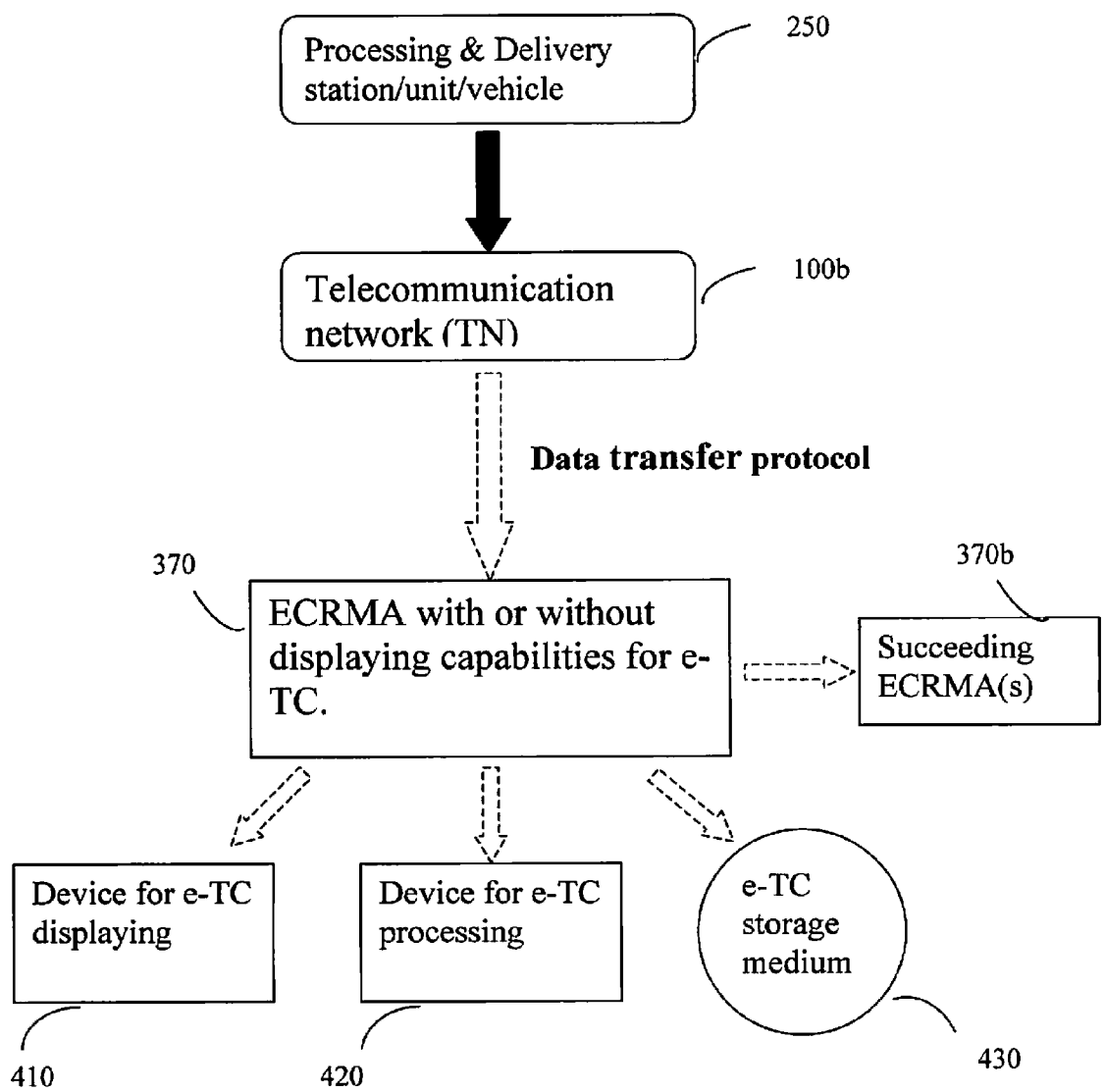

FIG. 3 shows the further details of the delivery of the e-TC from the processing and delivery station/unit/vehicle 250 through the telecommunication network (TN) 100*b* through a data transfer protocol to an ERCMA 370 with or without display capabilities to further process the e-TC. The data transfer protocol may include but not limited to push and/or pull and/or FTP (File Transfer Protocol) and/or other existing or future data transfer protocols which allow the transfer of e-TC through TN.

The ERCMA may then utilize a device for e-TC display (step 410). Alternately, the ERCMA may send the e-TC to a device to further process the e-TC (step 420). Furthermore, the ERCMA may also send the e-TC to a storage medium ready for delivery or for other purposes. The ERCMA may include electronic mail devices or the passive receiver devices. The e-TC received by the ECRMA 370 from processing and delivery station/unit/vehicle 250 can be further sent to succeeding ECRMA(s) 370*b* with a data transfer protocol. Then the ECRMA and succeeding ECRMA as receiver and sender devices may provide/send the electronic contents to other identities in different forms such as an electronic content (including but not limited to multimedia contents) displaying device (step 410), a device for message processing the e-TC (step 420) or a magnetic or optical media as a storage medium (step 430). In sending e-TC from ECRMA 370 to succeeding ECRMA 370*b*, ECRMA 370 will decide if the e-TC to be sent will keep the original received form or/and be in the modified form, if any, done by ECRMA 370. The information related with the modification like where, who and when the modification takes place and any comment by the modifying agent (person or ECRMA) can be the related content sent along with the modified e-TC. One application in this regard is useful in a social group engaged in a given interest/purpose. As the modified e-TC can be sent in this hybrid delivery system to people without access to TN, these disadvantaged people can also participate in this special social group.

The present invention thus provides new and improved systems and methods to facilitate more rapid and efficient delivery of electronic content transmissible through the telecommunication network. The delivery can be accomplished by use of a tangible deliverable object that embodies the contents transmitted in the electromagnetic form via the telecommunication networks. Or the delivery may be through ECRMA with varieties of routes and forms such that the efficiency of delivery can be improved and the time of delivery can be further shortened. Specifically, the delivery systems and methods may be implemented with server stations function as service processing center and also remote distribution stations. The server stations are connected to the Internet or any other types of network systems for transmitting network transmissible content. The server stations receive the network transmissible content. The sever station can either convert the network transmissible content into physically deliverable items to execute a delivery program as instructed and designated by an electronic content sender to the designated recipient. Alternately, the server station may transmit the network transmissible content to content distribution stations and then to ECRMA such as passive receiver devices accessible by designated recipient(s) and/or e-mail devices ready for carrying out further operations on the electronic contents. An example of this application is that the aforementioned information is downloaded to a mobile phone, or a digital media player such as iPod (TM of Apple, Inc.), or a tablet such as iPad (TM of Apple, Inc.) or Kindle (TM of Amazon), etc., and the mobile phone or media player or tablet is delivered to the designated recipient. Then, if desired, the information in the delivered device, in its original form or after undergoing further processing, can be resent to another recipient through the telecommunication networks.

The delivery systems and methods of this invention thus provide convenience and efficiency by setting up processing center with server stations connected through telecommunication network to a message sender. Each of the network-accessible sender equipment serves an equivalent function as a modern sender-controllable telegram machine. A message sender transmits network transmittable content to the server stations. The server stations then send the contents transmitted over the network and carries out an optional operation to either convert the content into tangible deliverable items such as a letter, a printed document, a compact disk, or any other physical embodiment of the messages according to a message sender's instruction. Alternately, the server stations may execute a process to transmit the contents to an ECRMA that allows the electromagnetic information through a telecommunication network (TN) in a non-tangible format. The delivery process will not be affected by traffic conditions in the real world. The delivery time is much faster than the delivery of a tangible deliverable. The process is more resource-efficient as it involves less manpower and other resources. The ECRMA-can be a more functioning-capable device, network, or a computer system. This feature is especially useful in the field of digital document management. One specific example is to provide the delivered content and store the contents in various 'fee-per-service' facilities.

Therefore, this invention discloses a hybrid network for delivering the transmissible content either as delivery of a tangible deliverable or in electromagnetic formats to an ECRMA. Therefore, the electromagnetic information received from various senders can be delivered in one single tangible deliverable, achieving the efficiency of delivery materials. Furthermore, the information from various senders can be distinguished, categorized and separately processed by either embedded mechanism including but not limited to software function in the tangible deliverable, and/or by dedicated software or different electromagnetic formats which the recipient can use. This system of this invention will enable any electromagnetic information, made TN-transferable by individual user(s) or by the service station(s) of the system, to be delivered in multiple routes, devices, and functional processes. People with or without access to TN can send the information to be delivered via TN in multiple manners. The system of this invention therefore provides more choices to deliver the electromagnetic information.

Furthermore, in this hybrid delivery system, the tangible deliverable can be a device. This device is a tangible deliverable, but not simply a storage medium of magnetic/optical medium. It can have the function of displaying and processing the contained electromagnetic information of text, audio, graphic/video data and any other electromagnetic information. It also has the capability to resend the aforementioned information by connecting itself through the telecommunication networks.

For these reasons, the present invention discloses a system and method to provide a great deal of flexibility for the sender to specify and customize the packaging and forms of the deliverable items and furthermore, the delivery destination may include an e-mail device. The e-mail devices differ from other e-mail services currently in use in the following ways. The 'list of contents' in the 'mail' can be viewed before a decision is made to selectively open or download part or whole of the 'mail'. The content can be further sent to different ECRMA even before the 'mail' is opened. In this case further functional processes may be carried out without the need to upload the contents. Of course, additional content can be added (uploaded) to the previous content and sent as a new 'package'. This e-mail device can receive 'mail' from users who have no access to TN. One request from the sender allows the TN-transferable electromagnetic information to be sent in different and multiple ways, it can be a tangible, and/or intangible format(s) including the ECRMA. Furthermore, the server station in the system and/or the ECRMA can function in many ways to accomplish the information processing including but not limited to the conversion features of conversions among different formats of audio, textual, graphic and video contents, e.g., to convert video or audio contents to textual output or converting a textual data into audio output, to convert the text from one language into another or several languages, thus the ECRMA can further enhance the convenience and process of the contents received by the recipients.

FIG. 4 is a functional block diagram to illustrate an e-TC managing system (EMS) of this invention. The EMS includes an e-TC managing complex (EMC) 650 as a communication hub and platform to interface and carry out content and data exchanges between the e-TC senders 500 and other on-line users 520 who accesses the e-TC through network systems and/or requests to deliver a user selected e-TC to designated e-TC recipients. The EMC 650 carries out the functions between the content-sender (Step 210 and 220 in FIG. 2, Step 500 and 520 in FIG. 4) and the content recipient (Step 360 and 370 in FIG. 2 and Step 700 in FIG. 4). The EMC 600 includes an e-TC receiving-processing-delivery center 600 and an on-line storage 620 to store the e-TC received. The online storage of e-TC (620) is a convenient way for senders to choose e-TC to be sent to designated recipient. The e-TC from sender 500 is sent to a recipient via the hybrid delivery system and is also stored in the online storage 620. Thus the e-TC sent from sender 500 can be accessed and used by sender 520 who is not the original e-TC producer. The EMC 650 further interfaces with receipts of the e-TC to deliver the e-TC to these recipients 700 by sending the e-TC by using a hybrid mode of delivery including on-line delivery and/or delivery of tangible objects through different combinations of delivery routes to the designate recipients 700. The EMC 650 further carries out the post-delivery tasks of monitoring and tracking the processes performed by the recipients as will be further described below.

FIG. 5 is a functional block diagram to show the processes carried out, in an example of electronic advertisement system, with this invention implemented with an EMC 650 to communicate with sender and/or requestor 530 of e-TC. The sender can send e-TC to EMC and/or request e-TC already in the storage site at EMC to be sent to designated recipient. The EMC receives the e-TC with instructions from the sender or receives requests with sender-defined instructions for tracking parameters. Then EMC adds tracking mechanism (TM) into the e-TC for setting the tracking parameters and instructions. The EMC 650 then sends the e-TC to recipients 700 in one or more of different formats and via one or more different transmission routes that may include network transmission or delivered as physical embodiment of the e-TC as a deliverable objects such as DVD or USB drives, etc. The ECRMA 720 receives the e-TC with tracking system (TS) information in one or more formats and the information obtained from the TS is sent to the e-TC sender and/or EMC (650 and/or 690) through different combinations of transmission routes.

The ECRMA can transmit TS information to apparatus 670 that is functionally capable of receiving the TS information and sending the TS information to EMC (650 and/or 690). One example of this application is that the e-TC is received and stored together with TS information in a mobile phone. The mobile phone is brought to a location where there is an apparatus which can recognize the e-TC when the communication between the said ECRMA and the apparatus in that location is established. This communication (810) can be accomplished in one or more ways, like physical contact between the two said devices, or through one or more components of TN like near field communication (NFC), etc. The TS information is thus retrieved by apparatus 670 and sent to EMC (650 and/or 690). The EMC (650 and/or 690) can also send relevant information of the said e-TC to apparatus 670 to facilitate apparatus 670 recognizing and communicating with the ECRMA with the said e-TC. One example in this application is that an electronic coupon is sent, at the request of the sender 530, by EMC 650 or 690. The electronic coupon is sent via the route to 700 then to ECRMA 720. Relevant information of this electronic coupon is also sent by EMC 650 or 690 to apparatus 670. Thus when the said ECRMA 720 is brought to a location where apparatus 670 can function, the communication between apparatus 670 and ECRMA 720 can be established as both apparatus have relevant or 'matching' information from the same electronic coupon. The electronic coupon can be redeemed at this location and the TS information is sent to the sender of the electronic coupon. Of course, apparatus 670 may also recognize ECRMA 720 without the 'matching' information sent from EMC 650 as long as the framework in apparatus 670 is set up to accomplish the task of recognizing the said ECRMA.

At the disposal of the sender 530 (Step 105 in FIG. 1 and Step 210 and 220 in FIG. 2), the e-TC can embody the location information of the apparatus 670 relevant to the location of recipient 700. This helps the communication of the recipient and apparatus 670. An example of the application is that an electronic coupon is delivered to the recipient 700 and then stored in ECRMA 720 or printed out in paper format. The nearby locations that this coupon can be redeemed are displayed along with the coupon. The ECRMA or the printout is brought to a location chosen by the recipient and the coupon is redeemed, with the tracking information collected at the transaction and sent to sender 530 via EMC 650. In a case that the recipient's current location is different from the time the e-TC arrived through this hybrid delivery system, the recipient can get in touch with EMC, by phone or through TN or other means, to request the current nearby location information of apparatus 670 relevant to the recipient's current location. Again in the example of electronic coupon, this enables the on-the-move recipient to find the nearby location where the coupon can be redeemed.

At any time when ECRMA 720 is connected to EMC (650 and/or 690) through TN (820 and/or 820*a*), additional online tracking mechanism (TM) can be activated. In this situation, the TM will be operating in the online fashion with interaction of EMC (650 and/or 690) in the communication with ECRMA 720. The e-TC sender 530 in this figure and 105 in FIG. 1 receives the TS information to track the detail of processes performed by the recipient on the e-TC. For example, a sender of electronic ad will thus be able to collect information about the effectiveness and market target group data of the advertisements embodied in the e-TC.

The TS is under working also at times when ECRMA 740 is not connected to TN. This feature can be called offline tracking in contrast to online tracking. The tracking information in the offline tracking is relayed to EMC 650 or 690 through one of more routes of 810, 820 and 820*a*. Then the tracking information is relayed to e-TC sender 530 in this figure and 105 in FIG. 1. This hybrid e-TC delivery system also uses online tracking in additional to the offline tracking. The feature of utilizing offline tracking plus online tracking is another feature of this invention. This feature can be called hybrid tracking.

Information update in one component of this system, as may occur through 530, 650 or 690, 700 or 720 (including succeeding ECRMA 370*b* in FIG. 3), can be synchronized to all or selected components of this system, through all the possible connections in FIG. 5, including deploying offline and online approaches. The control or the regulation of this synchronization can be from one or more than one components of this system.

The e-TC Sender (530 in FIG. 5 and 105 in FIG. 1) receives the feedback from the recipient 700 and ECRMA 720 (and succeeding ECRMA 370*b* in FIG. 3). Subsequently, further action can be made based on the feedback received. The further action will include but not limited to sending updated e-TC to the recipient through this hybrid e-TC delivery system. The decision of further action can be made by either human and/or by automated system. Thus this system will be operating as a closed-loop controller or closed-loop system. One example of this closed-loop controller is an electronic ad is sent to a recipient via this hybrid e-TC delivery system. Depending on the post-delivery activities of this recipient, custom-tailored additional e-TC can be subsequently sent to enhance or follow-up the decision-making of this recipient. From here again, it is clear that the sender in 530 of FIGS. 5 and 105 of FIG. 1 can be a human or the non-human setup, in either case the sender is the point where the e-TC is originated in this hybrid e-TC delivery system.

The EMC in communication with the sender 530 can be in the form of one setup or in the form of multiple setups in the TN. The sender 530 has the choice to communicate with one EMC and more than one EMC in this process of sending an e-TC for delivery and receiving tracking information for the delivery and post-delivery activities. The various EMCs in this system can keep constant communication with each other like between EMC 650 and EMC 690.

FIG. 6 illustrates the delivery and tracking system of this invention in two different stages, i.e., the delivery stage and the post-delivery stage. In the delivery stage, the EMC 650 sends out the e-TC either as a tangible deliverable object or as an e-TC to an ECRMA and the delivery status, like delivery time, location, acceptance status, etc., are sent to the e-TC sender. The processes then enter into a post-delivery stage. In a tangible deliverable object, there is an embedded tracking mechanism (TM) or program contained in the tangible deliverable object. As an alternative when the e-TC is delivered to the ECRMA, the ECRMA may build a TM program/function into the e-TC through the interaction of the e-TC and the ECRMA. For example, a program needed to be installed to the ECRMA to view or access the delivered e-TC can have built-in TM. This needed program can be delivered along with the e-TC or it can be downloaded to the ECRMA via TN or can be accessed via TN with the needed program functionally reside in the TN in the form of cloud computing service. The needed program may also interact with the existing applications/programs in the ECRMA to establish the TM. As an additional option, the TM may be built into the operating system of the ECRMA 730. As another option, the TM may be built into the integrated circuit (IC) chip or other functional/hardware component of the ECRMA 730. The tracking activity may use one or more or all of the above-mentioned tracking options and their variants and any of their future evolving forms. The monitoring and tracking tasks in the post-delivery stage proceed with the tracking information (TI) being continuously updated and stored in the ECRMA. The tracking information (TI) is further transmitted via route 820 or 820*a* as shown and described in FIG. 5 back to the EMC 650 or 690, or via interaction of ECRMA 720 with apparatus 670 as shown and described in FIG. 5.

In this hybrid delivery system, each sender and each recipient is a unique identity which can represent a human recipient or an ECRMA. The specifically requested delivered e-TC in combination with the unique sender and the unique recipient constitutes a unique entity. And this unique entity will keep developing with the unique feature of the entity retained in the continued process when this given e-TC is manipulated in various possible ways in this system by the recipient and/or the sender. This feature of uniqueness is deployed in the tracking of delivery status and post-delivery status/activities.

The tracking information related to the e-TC delivered in this hybrid delivery system includes any processes performed by the e-TC recipient on the e-TC. They include but not limited to the displaying of the e-TC on ECRMA with displaying capabilities, modifying the received e-TC by the recipient or the system of the ECRMA, forwarding the received e-TC or modified e-TC, copying the received e-TC or modified e-TC, the time and duration any of the above processes takes place, the location that any of the above processes takes place as aided by present and future location-tracking algorisms and technology available. One exemplary use of this tracking process is that a special code including but not limited to a bar code or a quick response code (QR code) is generated by the TM. This code carries the tracking information including the tracking history and most updated tracking status. This code can be shown on the ECRMA for the recipient to use during an interaction with an accepting apparatus 670. An alternative is that this code can be shown as a printed format and the recipient can take the print to the accepting location to complete the intended service, like printing a coupon with the said code on the print and take the print to a merchandise to redeem the coupon. Another alternative is that the code can be hidden to the recipient but can be retrieved and shown by the apparatus 670 or the EMC 650 or 690.

The TM will remain as an inherent feature of the e-TC delivered in this hybrid delivery system. When the delivered e-TC is transferred, either in its initial delivered form or in a form modified by the recipient, from either a tangible deliverable to an ECRMA (as from 360 to 370 in FIG. 2), or from one ECRMA to another (as from 370 to 370b in FIG. 3), the TM is carried forward and keeps on working until being ceased by the instruction algorism or software or other means in the TM or in this hybrid delivery system.

Special function can be incorporated in the e-TC delivered in this hybrid delivery system so that the recipient can be shown the tracking mechanism under working and make selection among different choices for the working of the tracking mechanism (TM). The recipient can choose to accept, reject or stop the tracking, or choose the level of tracking with each level of choice representing different combination of tracking parameters, or the recipient can select his/her own combination of tracking parameters.

The working of the tracking can be modified, or suspended, or ceased by prearranged programs built into the TM.

The EMC 650 and/or 690 can simultaneously track multiple recipients including subsequent ECRMAs (Step 370b in FIG. 3) and the tracking information relayed to the e-TC sender as requested by the sender.

In a situation when prior delivered e-TC has no tracking mechanism (TM) established or earlier working TM needs to be modified or updated or ceased as requested by sender 105 of FIGS. 1 and 530 in FIG. 5, or as deemed necessary by this hybrid delivery system, EMC 650 and/or 690 can send the required TM to ECRMA 720 in FIG. 5 or ECRMA 740 in FIG. 6 to accomplish the task.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A network communication system comprising: network processing stations for receiving and converting electronic or electro-magnetic data or content transmitted through telecommunication network to the network processing stations as an electro-magnetically transmissible contents (e-TC) into a hybrid content deliverable object comprises network transmissible content data files or physically deliverable object for carrying out a hybrid delivery as an initial delivery of the network transmissible content data files or physically deliverable object by a physical delivery process or through a network to a recipient and to an initial delivery electronic content receiving/managing apparatus (ECRMA) wherein the initial delivery ECRMA further transmits the e-TC to multiple succeeding e-TC managing complexes (EM Cs) each functioning as receiver and sender for distributing and delivering the e-TC as the network transmissible content data files to next subsequent EMC in multiple subsequent deliveries; wherein the hybrid content deliverable object further comprises an advertisement compact disk or DVD having a built in software function components as a feedback communication functional component for communicating to the ECRMA a post-delivery status and post-delivery activities of the multiple subsequent deliveries of multiple succeeding EMCs in addition to a report of a status of the initial delivery of the hybrid content deliverable object; and wherein the hybrid content deliverable object further having a built in tracking functional component for tracking and communicating a tracking system (TS) information to the ECRMA in an offline condition for tracking the post-delivery status and post-delivery activities of the multiple subsequent deliveries in addition to a report of a status of the initial delivery of the advertisement.

2. The network communication system of claim 1 wherein: said network processing station further receiving and converting the e-TC into a printed copy having coded bars or images available for scanning to activate the feedback communication functional component.

3. The network communication system of claim 1 wherein: said network processing station further receiving and converting e-TC into a compact disk (CD) or DVD or other magnetic/optical media including the feedback communication functional component for tracking and communicating the post-delivery activities of the multiple succeeding EMCs each functioning as the receiver and sender in carrying out the subsequent deliveries.

4. The network communication system of claim 1, wherein: said network processing station further receiving and converting the e-TC with photographic picture attached with a miniaturized chip for tracking and communicating the post-delivery activities of the multiple succeeding EMCs each functioning as the receiver and sender in carrying out the subsequent deliveries.

5. The network communication system of claim 1, wherein: said network processing station further receiving and converting the e-TC downloaded from a website or any other kinds of data-storage or downloadable resources into a printed copy having coded bars or images available for scanning to activate the feedback communication functional component.

6. The network communication system of claim 1 wherein: said network processing station further receiving and converting e-TC downloaded from a website or any other kinds of data-storage or downloadable resources into a compact disk (CD), or other magnetic/optical media including the feedback communication functional component for tracking and communicating the post-delivery activities.

7. The network communication system of claim 1 wherein: said network processing station further receiving and converting the e-TC downloaded from a website or any other kinds of data-storage or downloadable resources into a photographic picture having coded bars or images available for scanning to activate the feedback communication functional component.

8. The network communication system of claim 1, wherein: the hybrid content deliverable object further comprises a printed advertisement having coded bars or images available for scanning for activating a communication to the ECRMA of the post-delivery status and post-delivery activities of the multiple succeeding EMCs each functioning as the receiver and sender in carrying out the subsequent deliveries in addition to a report of a status of the initial delivery of a printed advertisement.

9. The network communication system of claim 1 wherein: thee-TC managing complexes (EMCs) each functioning as the receiver and sender further receiving, process and transmitting the post-delivery status of the post-delivery activity of the multiple subsequent deliveries carried out by the EMCs.

10. The network communication system of claim 1, wherein: the TC managing complexes (EMCs) each functioning as the receiver and sender further receiving the post-delivery status of the post-delivery activity of the multiple levels of subsequent deliveries from the ECRMA.

11. The network communication system of claim 1, wherein: thee-TC managing complexes (EMCs) each functioning as the receiver and sender further comprising an apparatus for communicating with the ECRMA to receive and relay communication with the ECRMA.

12. The network communication system of claim 1, wherein: the ECRMA further receives a tracking-system (TS) information offline for tracking the post-delivery status and post-delivery activity.

13. The network communication system of claim 1, wherein: the hybrid content deliverable object further comprises the advertisement compact disk or DVD having a built in tracking functional component for tracking and communicating a tracking system (TS) information to the ECRMA for tracking the post-delivery status and post-delivery activities of the multiple subsequent deliveries in addition to a report of a status of the initial delivery of the advertisement compact disk or DVD.

14. The network communication system of claim 1, wherein: the hybrid content deliverable object further comprises the advertisement embodied in the physically deliverable object having a built in hardware tracking functional component for tracking and communicating a tracking system (TS) information to the ECRMA for tracking the post-delivery status and post-delivery activities of the multiple subsequent deliveries in addition to a report of a status of the initial delivery of the advertisement.

15. The network communication system of claim 1, wherein: the ERCMA further includes an e-TC transmitting device for processing and transmitting the e-TC to at least a succeeding ERCMA.

\* \* \* \* \*